US012637967B1

(12) United States Patent
   Akyildiz

(10) Patent No.: US 12,637,967 B1
(45) Date of Patent: *May 26, 2026

(54) HEATER FOR EXHAUST POLLUTION MITIGATION

(71) Applicant: ECC TEC MSJ INCORPORATED, Boca Raton, FL (US)

(72) Inventor: Saban Akyildiz, Boca Raton, FL (US)

(73) Assignee: ECC TEC MSJ Incorporated, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/272,778

(22) Filed: Jul. 17, 2025

Related U.S. Application Data

(63) Continuation of application No. 19/174,640, filed on Apr. 9, 2025, now Pat. No. 12,366,188.

(51) Int. Cl.
   F01N 3/02       (2006.01)
   B01D 46/84       (2022.01)
       (Continued)

(52) U.S. Cl.
   CPC ............. F01N 3/027 (2013.01); B01D 46/84 (2022.01); B01D 53/94 (2013.01); B01D 53/96 (2013.01);
       (Continued)

(58) Field of Classification Search
   None
   See application file for complete search history.

(56) References Cited

U.S. PATENT DOCUMENTS

| | | | |
|---|---|---|---|
| 3,956,614 A | 5/1976 | Hervert | |
| 4,276,066 A | 6/1981 | Bly | |
| | (Continued) | | |

FOREIGN PATENT DOCUMENTS

| | | | |
|---|---|---|---|
| CN | 2597684 Y | 1/2004 | |
| CN | 205948865 U | 2/2017 | |
| | (Continued) | | |

OTHER PUBLICATIONS

Mohit A. Bagul et al., "Emission Reduction using Magnetic Pollution Filter", International Journal of Innovative Research in Science, Engineering and Technology, vol. 5, Issue 7, Jul. 2016.

(Continued)

*Primary Examiner* — Jelitza M Perez
(74) *Attorney, Agent, or Firm* — Dentons US LLP; Derek Auito

(57)           ABSTRACT

This disclosure includes a heater having a housing defining an inlet and outlet for a flow of gas through the housing and a heating element connected to a first terminal at a first interior position of the housing and to a second terminal at a second interior position of the housing. The first interior position is opposite the second interior position. The heater includes a first ceramic holder positioned at a third interior position of the housing. The third interior position is between the first and second interior positions of the housing. The first ceramic holder is configured to assist in retaining the heating element within the housing. The heater includes a second ceramic holder positioned at a fourth interior position of the housing that is opposite the third interior position. The second ceramic holder is configured to assist in retaining the heating element within the housing.

18 Claims, 4 Drawing Sheets

(51) Int. Cl.

| | |
|---|---|
| *B01D 53/94* | (2006.01) |
| *B01D 53/96* | (2006.01) |
| *F01N 3/021* | (2006.01) |
| *F01N 3/027* | (2006.01) |
| *H05B 3/06* | (2006.01) |

(52) U.S. Cl.

CPC ............. *F01N 3/0211* (2013.01); *H05B 3/06* (2013.01); *H05B 2203/003* (2013.01); *H05B 2203/007* (2013.01); *H05B 2203/022* (2013.01)

(56) References Cited

U.S. PATENT DOCUMENTS

| | | | |
|---|---|---|---|
| 4,450,681 A | 5/1984 | Sato | |
| 4,548,625 A | 10/1985 | Ishida | F01N 3/027 |
| | | | 60/303 |
| 4,945,721 A | 8/1990 | Cornwell et al. | |
| 5,063,029 A | 11/1991 | Mizuno et al. | |
| 5,234,668 A | 8/1993 | Harada et al. | |
| 5,264,186 A | 11/1993 | Harada et al. | |
| 5,411,711 A | 5/1995 | Swars | F01N 3/2026 |
| | | | 422/177 |
| 5,423,904 A | 6/1995 | Dasgupta | |
| 5,465,573 A | 11/1995 | Abe et al. | |
| 5,554,342 A | 9/1996 | Hirayama | B01J 35/56 |
| | | | 422/174 |
| 5,569,455 A | 10/1996 | Fukui | B01J 35/33 |
| | | | 422/174 |
| 5,582,805 A | 12/1996 | Yoshizaki et al. | |
| 6,585,940 B2 | 7/2003 | Abe et al. | |
| 8,309,032 B2 | 11/2012 | Plati | B01D 53/9454 |
| | | | 422/177 |
| 9,383,119 B2 | 7/2016 | Kida | F24H 9/02 |
| 11,149,607 B2 | 10/2021 | Akyildiz | |
| 11,187,131 B2 | 11/2021 | Brunel | F01N 3/2857 |
| 11,454,152 B2 | 9/2022 | Sadamitsu | F01N 3/2803 |
| 11,628,401 B2 | 4/2023 | Beall | H05B 3/12 |
| | | | 219/202 |
| 12,084,999 B2 | 9/2024 | Akyildiz | |
| 2001/0043890 A1 | 11/2001 | Son | |
| 2002/0053283 A1 | 5/2002 | Akyildiz | |
| 2004/0118111 A1 | 6/2004 | Covit | |
| 2006/0204408 A1 | 9/2006 | Son | |
| 2009/0074630 A1 | 3/2009 | Gonze | F01N 13/009 |
| | | | 422/174 |
| 2011/0162348 A1 | 7/2011 | Kim | F01N 13/009 |
| | | | 60/303 |
| 2012/0017570 A1 | 1/2012 | Kulkarni | F01N 11/00 |
| | | | 60/277 |
| 2013/0061576 A1 | 3/2013 | Gonze et al. | |
| 2013/0305692 A1 | 11/2013 | Hashimoto | F01N 3/10 |
| | | | 60/299 |
| 2014/0290229 A1 | 10/2014 | Hirth | F01N 3/281 |
| | | | 60/320 |
| 2016/0271561 A1 | 9/2016 | Nakayama | B01D 53/9454 |
| 2017/0016371 A1 | 1/2017 | Schlipf | H05B 3/48 |
| 2017/0218823 A1 | 8/2017 | Crawford | |
| 2017/0226909 A1 | 8/2017 | Hirth et al. | |
| 2022/0082042 A1 | 3/2022 | Crawford | F01N 3/2013 |

FOREIGN PATENT DOCUMENTS

| | | |
|---|---|---|
| CN | 206762544 | 12/2017 |
| DE | 102009014371 A1 | 9/2010 |
| EP | 153157 | 8/1985 |
| EP | 967174 | 12/1999 |
| EP | 0658369 | 4/2000 |
| EP | 1967712 | 9/2008 |
| EP | 4379199 | 6/2024 |
| GB | 2512845 | 10/2014 |
| JP | H04339122 | 11/1992 |
| JP | 2009097359 A | 5/2009 |
| WO | 9421900 | 9/1994 |
| WO | 52309 | 9/2000 |
| WO | 0157370 | 8/2001 |
| WO | 2017198292 | 11/2017 |

OTHER PUBLICATIONS

Ali S. Faris et al., "Effects of Magnetic Field on Fuel Consumption and Exhaust Emissions in Two-Stroke Engine", Energy Procedia, vol. 18, pp. 327-338, 2012.

Karthik Dhayakar et al., "Effect of Twin Sparkplug in Two Stroke IC Engine", International Journal of Science and Research (IJSR), vol. 4, Issue 2, pp. 2147-2153, Feb. 2015.

Adel Mahmmod Salih et al., "The effect of magnetic field on the boiler performance fueled with diesel", International Journal of Scientific & Engineering Research (IJSER), vol. 7, Issue 2, pp. 406-410, Feb. 2016.

H. R. Jackson et al., "Catalytic NOx Reduction Studies", SAE Technical Paper, 730568, 1973, doi: 10.4271/730568.

PCT International Search Report and Written Opinion of International Application No. PCT/US2025/033426, mailed Nov. 20, 2025 (14 pages).

HEATER FOR EXHAUST POLLUTION MITIGATION

This application is a continuation of U.S. application Ser. No. 19/174,640, filed Apr. 9, 2025, the entire contents of which are hereby incorporated by reference in their entirety.

TECHNICAL FIELD

This disclosure is generally related to a heater. More specifically, embodiments are directed to a heater with a ceramic holder for exhaust pollution mitigation and may address the need for an efficient and environmentally conscious exhaust system capable of reducing harmful emissions and pollutants present in exhaust gases.

BACKGROUND

With the increasing global focus on environmental sustainability and the adverse effects of emissions on air quality, there is a growing demand for innovative technologies that can effectively mitigate pollution from vehicles, automobiles, trains, marine vessels, construction equipment, agricultural machinery, power plants, and industrial facilities. Traditional exhaust systems often fall short in achieving a desired removal of pollutants, such as carbon dioxide and other emissions, leading to environmental concerns and regulatory challenges.

SUMMARY

The embodiments of this disclosure overcome the limitations of existing exhaust systems by providing a versatile solution for pollution mitigation in vehicles, power plants, and industrial facilities. The proposed heater and the system and method enhance the efficiency of pollutant removal, reduce operational costs, and promote environmental sustainability. Overall, the present disclosure represents a significant advancement in the field of exhaust systems and associated methods for pollution mitigation, such as in vehicles, automobiles, trains, marine vessels, construction equipment, agricultural machinery, power plants, and industrial facilities.

In one aspect, the present disclosure provides a heater, comprising: a housing defining an inlet and outlet for a flow of gas through the housing; a heating element connected to a first terminal at a first interior position of the housing and to a second terminal at a second interior position of the housing, wherein the first interior position is opposite the second interior position; a first ceramic holder positioned at a third interior position of the housing, the third interior position being between the first and second interior positions of the housing, the first ceramic holder configured to retain the heating element within the housing; and a second ceramic holder positioned at a fourth interior position of the housing, the fourth interior position being opposite the third interior position of the housing, the second ceramic holder configured to retain the heating element within the housing.

In some embodiments, the first terminal is electronically coupled to a power source and electronically insulated from the housing. In some embodiments, the heater further comprises a bracket coupled to the housing and configured to support the first ceramic holder. In some embodiments, the heater further comprises a vibration dampener positioned between the first ceramic holder and the bracket to assist in dampening vibrations of the heating element. In some embodiments, the heater further comprises a tab to mechanically assist in retaining the first ceramic holder within the housing. In some embodiments, the first ceramic holder comprises a ceramic body having a plurality of openings to receive a portion of the heating element. In some embodiments, the heating element is positioned at an angle relative to a direction of the flow of gas through the housing. In some embodiments, the angle is between 15 and 35 degrees.

In some embodiments, the first terminal is electrically connected to a connector configured to be coupled to a power supply; and the second terminal is electrically connected to an electronic ground, wherein electrical power is provided to the connector to heat the heating element. In some embodiments, the heater further comprises an additional connector connected to the power supply to provide additional electrical power to heat the heating element to further heat the heating element.

In some embodiments, the heater further comprises a second heating element connected to the first terminal and to the second terminal, wherein the first and second ceramic holders are configured to retain the second heating element within the housing. In some embodiments, the heating element is tilted at a first angle relative to a direction of the flow of gas through the housing; and the second heating element is tilted at a second angle relative to the direction of the flow of gas through the housing, wherein the second angle is opposite the first angle. In some embodiments, the heater further comprises a third heating element connected to the first terminal and to the second terminal, wherein the first and second ceramic holders are configured to retain the third heating holder within the housing.

In some embodiments, the heater further comprises a filter positioned downstream from the heating element relative to a direction of the flow of gas through the housing. In some embodiments, the heater is configured to perform a regeneration process to clean the filter. In some embodiments, the heater is a component of a vehicle exhaust system or a component of a power plant or an industrial exhaust system.

In another aspect, an exhaust system comprises: a housing defining an inlet and outlet for a flow of gas through the housing; a heating element connected to a first terminal at a first interior position of the housing and to a second terminal at a second interior position of the housing, wherein the first interior position is opposite the second interior position; a first ceramic holder positioned at a third interior position of the housing, the third interior position being between the first and second interior positions of the housing, the first ceramic holder configured to assist in retaining the heating element within the housing; a second ceramic holder positioned at a fourth interior position of the housing, the fourth interior position being opposite the third interior position of the housing, the second ceramic holder configured to assist in retaining the heating element within the housing; and a filter positioned downstream from the heating element relative to a direction of the flow of gas through the housing. In some embodiments, the filter is a diesel particulate filter, and the heating element is configured to perform a regeneration process to clean the diesel particulate filter.

In another aspect, a heater comprises: a housing defining an inlet and outlet for a flow of gas through the housing; a heating element connected to a first terminal; a first ceramic holder positioned at a first interior position of the housing, the first ceramic holder configured to retain the heating element within the housing; and a second ceramic holder positioned at a second interior position of the housing, the second interior position being opposite the first interior position of the housing, the second ceramic holder configured to retain the heating element within the housing.

In another aspect, a method for heating a gas comprises: providing a flow of the gas through a housing defining an inlet and outlet; heating the flow of gas using a heating element connected to a first terminal at a first interior position of the housing, the first terminal configured to receive power, and to a second terminal at a second interior position of the housing, the second terminal configured to be electronically grounded; and retaining the heating element in the housing using: a first ceramic holder positioned at a third interior position of the housing; and a second ceramic holder positioned at a fourth interior position of the housing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1A:
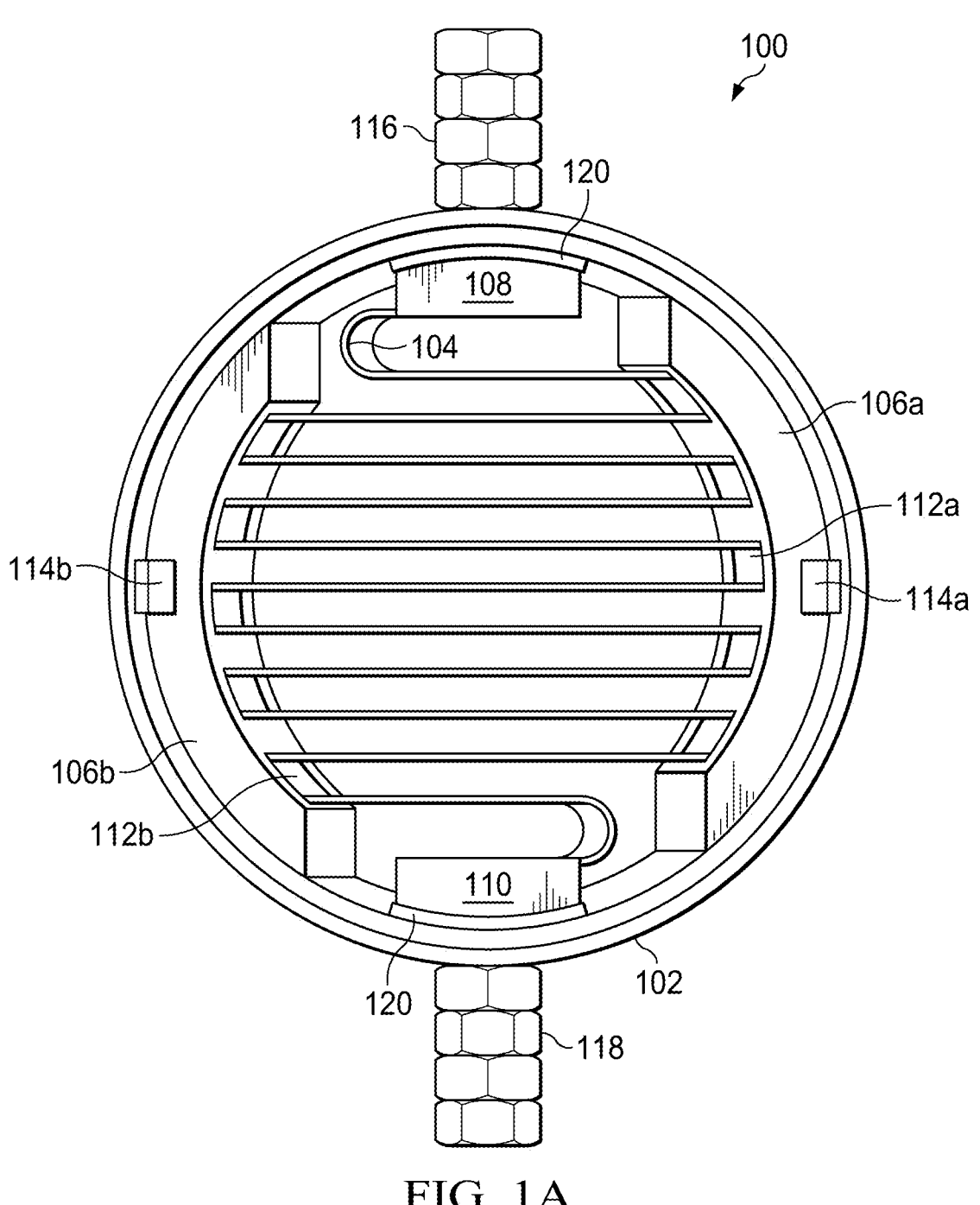
FIG. 1A is a diagram illustrating a first view of a heater in accordance with embodiments of the present disclosure.
Figure 1B:
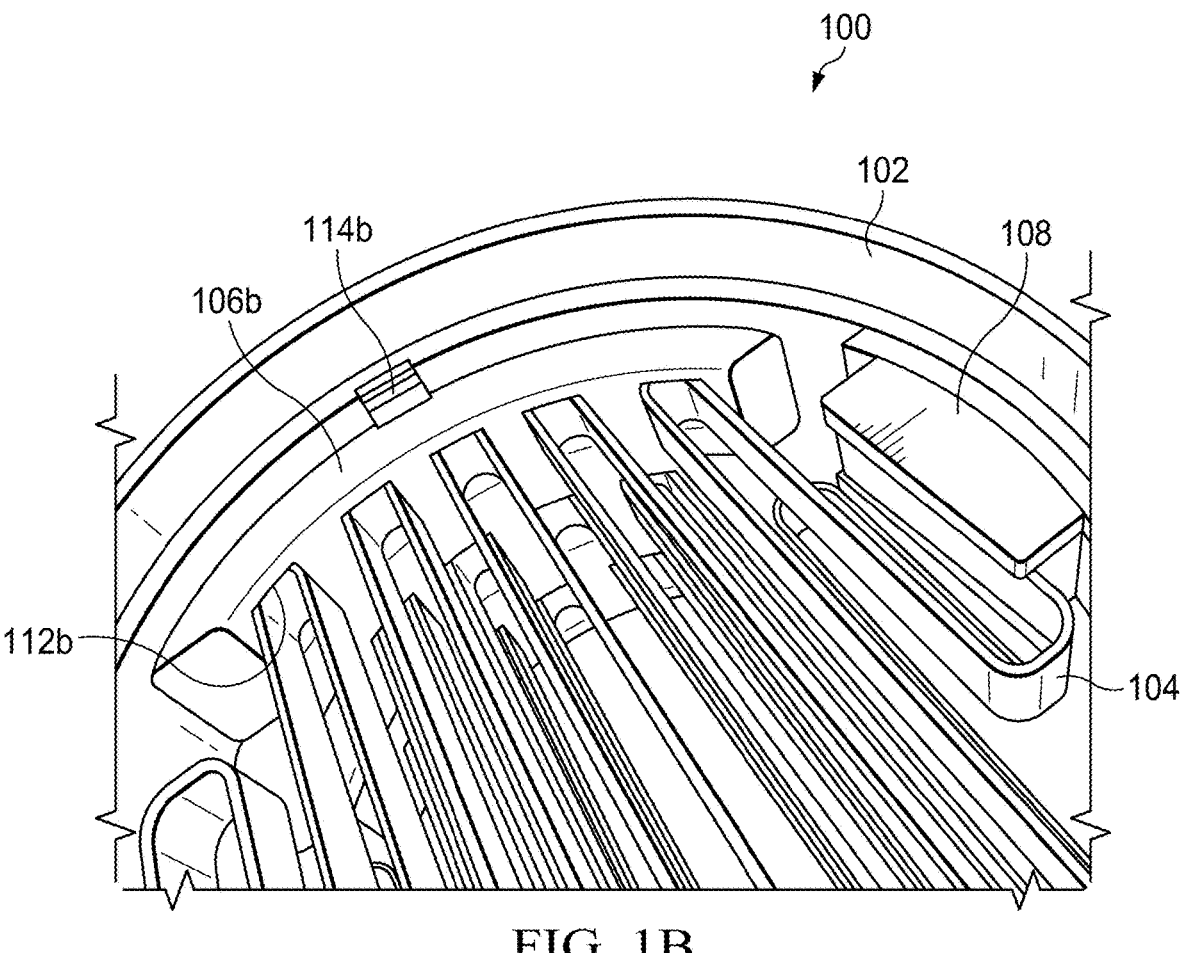
FIG. 1B is a diagram illustrating a second view of the heater of FIG. 1A.

FIGS. 1A and 1B illustrate an example heater 100. FIG. 1A shows a view of the heater 100 through an opening (e.g., through the inlet 314 illustrated in FIG. 3 and described below) of the housing 102 of the heater 100. FIG. 1B shows a perspective view of an interior portion of the heater 100. The heater 100 includes the housing 102, at least one heating element 104, and ceramic holders 106a,b formed of ceramic material for securing or supporting each heating element 104 in the housing 102. The ceramic holders 106a,b assist with holding the heating element 104 in place within the housing 102, providing electrical insulation between the heating element 104 and the internal wall of the housing 102, and/or dampening vibrations of the heating element 104 within the housing 102 (e.g., when the heater 100 is used in a vehicle exhaust system or other application involving mechanical vibration or other possible movement). It is understood that the ceramic holders may be formed of polymers, composites, and other advanced materials.

The housing 102 is a body defining an inlet and outlet (see FIG. 3) for a flow of gas (e.g., an exhaust gas from a vehicle, power plant, industrial process, etc.) through the housing 102. In the example of FIGS. 1A and 1B, the housing 102 is cylindrical with a substantially round or circular cross section. However, this disclosure contemplates the housing 102 having any other appropriate shape for a given application (e.g., with a square, rectangular, oval, or other cross-sectional shape). The housing 102 may be made of steel or another material resistant to elevated temperatures.

In the example of FIGS. 1A and 1B, the heater 100 includes three heating elements 104 (only one heating element 104 is visible in the view of FIG. 1A). However, this disclosure contemplates a heater having more or fewer heating elements 104 (e.g., from one to greater than three heating elements 104). The heating element(s) 104 are connected to a first terminal 108 at a first interior position of the housing 102 (e.g., at the top of the housing 102 based on the perspective shown in FIG. 1A) and to a second terminal 110 at a second interior position of the housing (e.g., at the bottom of the housing 102 based on the perspective shown in FIG. 1A). In the example of FIG. 1A, the first interior position of terminal 108 is opposite the second interior position of terminal 110.

In the example of FIGS. 1A and 1B, the terminals 108, 110 are metal (e.g., steel) blocks to which the ends of the heating element(s) 104 are attached (e.g., using a screw or other appropriate attachment). However, any other electrical connection may be employed that is compatible with the high temperatures provided by the heating element(s) 104. The terminals 108, 110 connect to corresponding external electrical connectors 116 and 118, respectively. For instance, connector 116 may be connected to a positive terminal of a power supply, while connector 118 is connected to the negative terminal of the power supply or to an electronic ground. In some embodiments, one or more additional connector 116 and/or 118 may be included. The additional connectors 116 and/or 118 may be connected to the power supply to provide additional electrical power to further heat the heating element 104.

An insulating material 120 may be positioned between the terminals 108, 110 and the housing 102 to electrically insulate the terminals 108, 110 from the housing 102. The insulating material 120 is resistant to high temperatures. As an example, the insulating material 120 may be a piece of a fibrous mounting material, such as Interam™ Mat Mount 7000NC available from 3M™ or a similar material. Other insulating materials 120 may be used.

The heating element(s) 104 are any appropriate type and shape of electrically heatable structures. For example, the heating element(s) 104 may be resistive heaters. The shape of the heating element(s) 104 shown in FIGS. 1A and 1B is exemplary only. Other shapes may be used. The heating element(s) 104 are heated when supplied power from a power source, such as a battery or electrical outlet. As an example, a total power supplied to each heating element 104 may be about 375 W to achieve a target temperature in a range from either about 600-1200° C., depending on the pollution mitigation scenario. As described above, in some embodiments, additional power is supplied (e.g., via an additional connector 116 and/or 118). In such embodiments, the total power may about 750 W.

A controller may be programmed to send different voltages or currents to the heating element(s) 104 to achieve a target temperature (e.g., a temperature between maximum and minimum threshold values). In some cases, the controller may be programmed to provide power to different numbers of heating elements 104 depending on an amount of heating needed to reach the target temperature. Such a controller may receive temperature and/or pressure information from one or more sensors, and the amount of power provided to the heating element(s) 104 may be adjusted to achieve the target temperature. The controller may include processing circuitry, communications interfaces, and memory for storing and executing software instructions that allow the controller to read values from temperature sensors, determine whether additional heating is needed, and control the power supplied to the heating elements 104 to provide the additional heating.

A first ceramic holder 106a is positioned at a third interior position of the housing 102 that is between the first and second interior positions of terminals 108 and 110, respectively. In the example perspective of FIG. 1A, the third position corresponds to a position along the right interior wall of the housing 102. The first ceramic holder 106a includes a ceramic body with a plurality of openings 112a, which are sized, shaped, and positioned to receive portions of the heating element 104. For example, the rounded ends along the right side of the heating element 104 (in the perspective of FIG. 1A) fit into the openings 112a. These openings 112a assist in retaining the heating element 104 within the housing 102 while optionally also providing electrical insulation and/or vibration dampening. The openings 112a may be holes or indentations in the body of the ceramic holder 106a. As shown in FIG. 1B, a series of openings 112a,b in the ceramic holders 106a,b to hold one heating element 104 may be at positions that are offset from the openings 112a,b to hold an adjacent heating element 104.

A second ceramic holder 106b is the same or similar to the first ceramic holder 106a but is positioned at a fourth position along the opposite internal wall of the housing 102 from the first ceramic holder 106a. The second ceramic holder 106b provides further support, electrical insulation, and/or vibration dampening to the heating element 104. Like the first ceramic holder 106a, the second ceramic holder 106b also includes a ceramic body with a plurality of openings 112b, which are positioned to receive portions of the opposite end of the heating element 104. For example, the rounded ends along the left side of the heating element 104 (in the perspective of FIG. 1A) fit into the openings 112b. The openings 112b may be holes or indentations in the body of the ceramic holder 106b.

In some embodiments, the first and second ceramic elements 106a,b are held in place at least partially using corresponding tabs 114a,b. For example, tabs 114a,b may be moved into the position shown in FIG. 1A (e.g., by bending the tabs 114a,b) to mechanically assist in retaining the first and second ceramic elements 106a,b within the housing 102.

Figure 2:
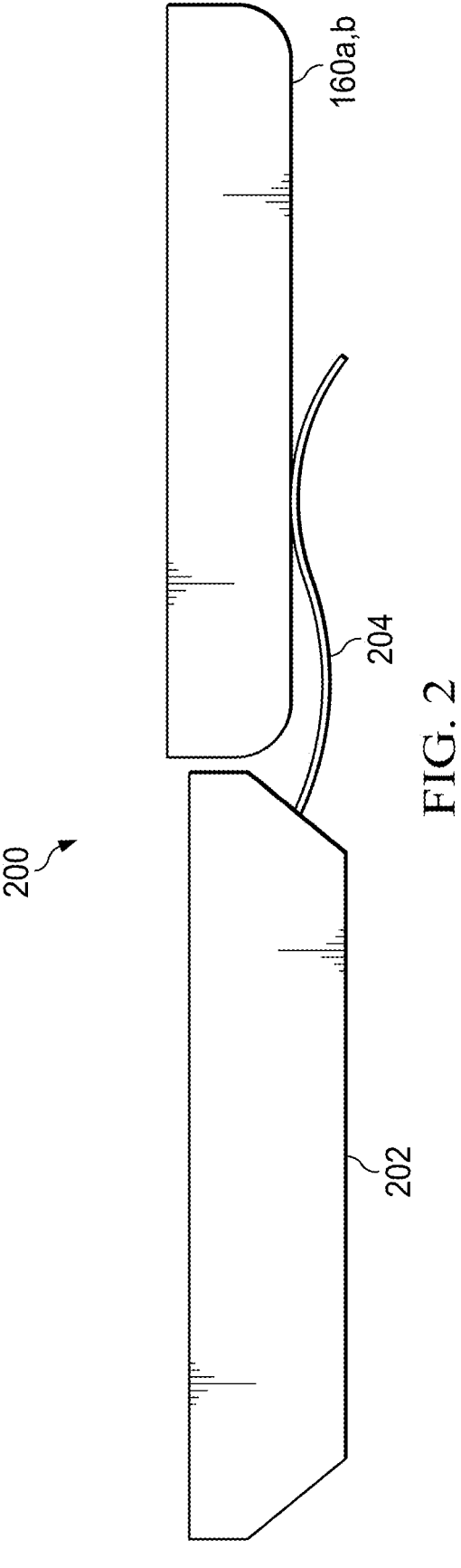
FIG. 2 is a diagram illustrating a ceramic holder assembly of a heater in accordance with embodiments of the present disclosure.

In some embodiments, the first and second ceramic holders 106a,b are held in place at least partially using a ceramic holder assembly that is attached to the housing 102. FIG. 2 illustrates components of an exemplary ceramic holder assembly 200 which may be secured within the housing 102 of FIGS. 1A and 1B to hold the ceramic holders 106a,b. For example, the ceramic holder assembly 200 may be welded in place within the housing 102 or attached through another appropriate method. The ceramic holder assembly 200 includes a bracket 202 which is coupled to the housing 102 and a vibration dampener 204 positioned between the ceramic holder 106a,b and the bracket 202 to assist in dampening vibrations of the heating element 104. In the example of FIG. 2, the vibration dampener is an S-shaped strip of metal material that is bent or formed in the shape of the letter "S." This shape can be created by bending the metal strip in two opposing curves that resemble the letter "S." The S-shaped metal strip can function as a spring to allow it to store and release energy.

This metal material may be aluminum, copper, or another material with appropriate thermal and mechanical properties for providing vibration dampening and resisting the high temperatures of the heater 100. This metal material may be a mixture of copper and steel, e.g., a copper-steel alloy or copper-clad steel. In other embodiments, the vibration dampener 204 includes one or more springs and/or a strip of metal with a different shape. The bracket may include a base that attaches to the housing 102. The base is at least as long as the length of the ceramic holder 106a,b. Surfaces extend normal to the base from a top and bottom edge of the base. The height of the surfaces are at least as high as a height of the ceramic holder 106a,b, such that the ceramic holder 106a,b fits within an interior of the bracket 202. A lip extends from the end of each of the surfaces to assist in retaining the ceramic holders 106a,b within the interior of the bracket 202.

Figure 3:
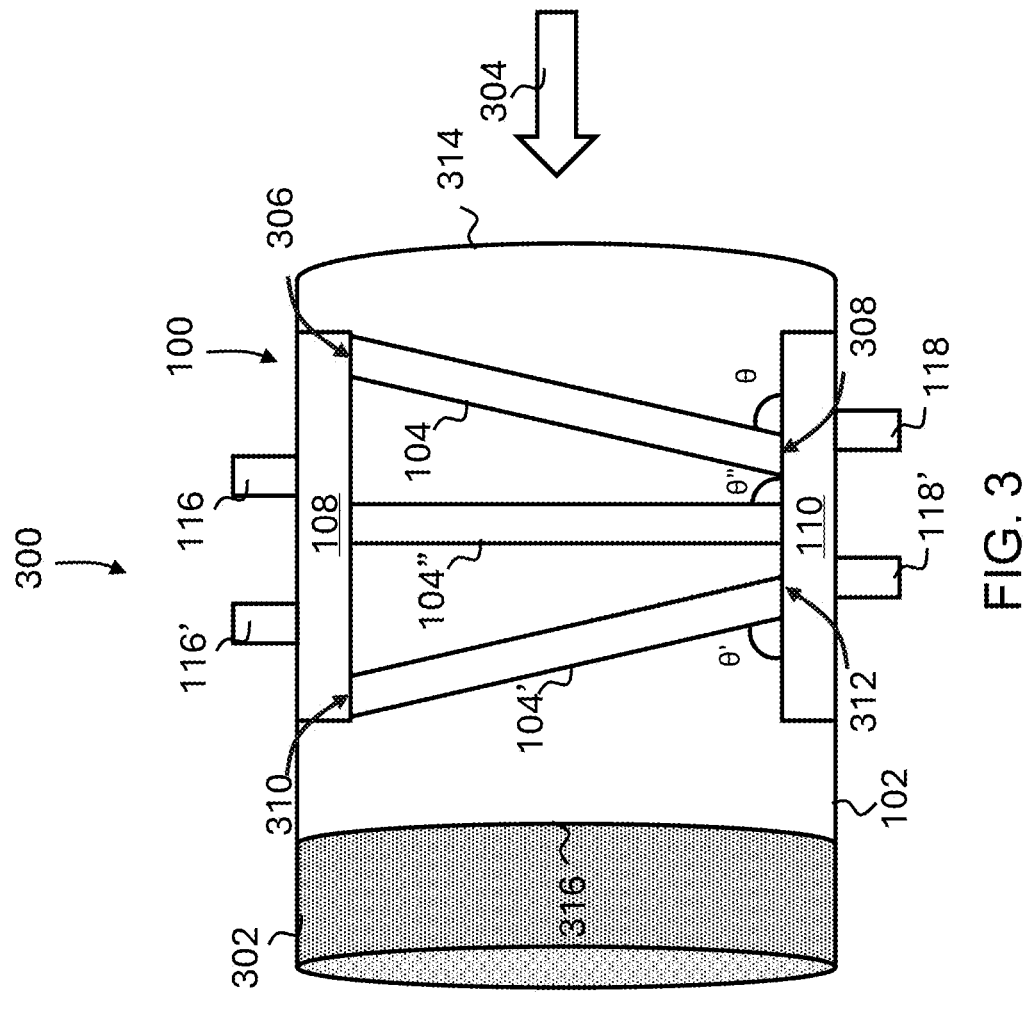
FIG. 3 is a diagram illustrating a cross-sectional view through an exhaust system in accordance with embodiments of the present disclosure.

FIG. 3 illustrates a cross-sectional view along the length of an exemplary exhaust system 300 of this disclosure. The exhaust system 300 includes a heater 100 (see FIGS. 1A and 1B and the corresponding description above) and a filter 302. The exhaust system 300 may be all or a portion of vehicle exhaust system, a power plant exhaust system, or an industrial exhaust system. In the example of FIG. 3, the heater 100 includes three heating elements 104, 104', and 104". However, as described above, the heater 100 may include more or fewer heating elements 104.

In the example of FIG. 3, the heater includes two heating elements 104 and 104', which may be tilted at an angle ($\theta$ and $\theta'$, respectively) relative to the direction of the flow of gas 304 through the housing 102, while heating element 104" is in the "straight" configuration of FIGS. 1A and 1B (e.g., at an angle $\theta"=90°$). FIGS. 1a and 1B show an embodiment in which the angles $\theta$, $\theta'$, and $\theta"$ are each 90°. However, in other embodiments, $\theta$ and $\theta'$ may be between about 15° and 35°. For example, $\theta$ and $\theta'$ may be about 25°. In the example of FIG. 3, a connection 306 between the heating element 104 and the first terminal 108 is positioned nearer the inlet 314 of the housing 102 than a connection 308 between the heating element 104 and the second terminal 110, such that heating element 104 is tilted at angle $\theta$. Meanwhile, the other heating element 104' may be tilted at an opposite angle $\theta'$, such that a connection 310 between the heating element 104' and the first terminal 108 is positioned nearer the outlet 316 of the housing 102 than a connection 312 between the heating element 104' and the second terminal 110. Tilting one or more of the heating elements 104, 104' may provide improved heating of the gas 304 flowing through the housing 102.

The filter 302 is positioned downstream from the heating elements 104, 104' relative to a direction of the flow of gas 304 through the housing 102. The filter 302 may be any appropriate type of filter for the type of gas 304 being heated. For example, the filter 302 may include a particulate filter (e.g., a diesel particulate filter, DPF), an oxidation filter, and/or a reduction filter (e.g., a selective catalyst reduction, SCR, filter). The filter 302 may fit within the housing 102 or may be external to the housing 102 (e.g., at a point immediately or farther downstream from the heater 100.

The heater 100 may perform a regeneration process to clean the filter 302. For example, when the filter 302 is a DPF of a vehicle, the filter 302 captures and stores particulate matter (e.g., soot) from exhaust gases to reduce harmful emissions. Over time, the filter 302 collects a significant amount of particulate matter, which needs to be burned off through a regeneration process to keep the filter functioning as intended. Conventionally, regeneration processes rely either on the system passively achieving appropriate conditions of temperature and gas flow rate to perform regeneration (via a passive regeneration process) or by actively causing the vehicle to increase fuel injection amount to increase the temperature of the exhaust gas to perform active regeneration. The conditions needed for conventional passive regeneration may not be reached frequently enough depending on vehicle operating conditions to ensure a DPF is sufficiently cleaned. Meanwhile, conventional active regeneration results in fuel waste, temporary decreases in vehicle performance, and increased engine noise during the regeneration process.

The heater 100 of this disclosure facilitates improved alternative regeneration processes, which are not limited by the intermittent nature of passive regeneration and do suffer from the drawbacks of conventional active regeneration. Instead, the heater 100 can be activated (e.g., by a controller as described above) on demand to provide heating for filter regeneration without burning extra fuel to achieve a target temperature (e.g., of 1000° F. or another appropriate temperature for the filter type) to burn particulate matter from the filter 302. In some embodiments, regeneration via the heater 100 may be performed based on a user input (e.g., when an operator operates a user interface, such as a button or other input device, to start the regeneration process). In some embodiments, regeneration via the heater 100 may be performed automatically at regular intervals (e.g., of time, vehicle mileage, etc.). In some embodiments, one or more sensors may provide an indication of particulate matter build up in the filter 302, and regeneration may be performed when a threshold level of particulate matter build up is reached.

While primarily described for mitigating pollution in exhaust systems, the heater 100 of this disclosure may be used for other purposes, such as to heat air or another gas that is not an exhaust gas. For example, the heater 100 may heat gas or air used in another industrial process not related to the removal of pollution from exhaust gas. For example, a gas may be heated as part of chemical production process, a manufacturing process, or the like.

The heater 100 described herein mitigates the cold-start problem common with conventional exhaust systems because of its ability to quickly heat to a desired temperature. Upon startup of an engine from a cold start, the heater 100 is simultaneously turned on by the controller to aid in heating the internal temperature of the catalytic converter above the temperature of the exhaust gases and particulate matter. The heater 100 can remain on after reaching a desired temperature or it can be turned off and then turned back on if the temperature within the catalytic converter drops below a threshold temperature. This is done via the controller which can receive input signals from one or more thermometers and other sensors and generates a signal to control the activity of the heater 100 and thereby accelerate heating the internal temperature of the catalytic converter to a desired internal temperature and aid in maintaining the desired internal temperature above a threshold of the catalytic converter to oxidize harmful exhaust gases.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any portions of this application. Where the context permits, words in the above Detailed Description using the singular or plural number may also include the plural or singular number, respectively. The word "or," in reference to a list of two or more items, covers all the following interpretations of the word: any of the items in the list, all the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range.

As used herein, the word "of" refers to any permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A heater, comprising:
a housing defining an inlet and outlet for a flow of gas through the housing;
a first heating element connected to a first terminal at a first interior position of the housing and to a second terminal at a second interior position of the housing, wherein the first interior position is opposite the second interior position;
a second heating element connected to the first terminal and to the second terminal,
wherein the first heating element is tilted at a first angle relative to a direction of the flow of gas through the housing; and
wherein the second heating element is tilted at a second angle relative to the direction of the flow of gas through the housing, wherein the second angle is opposite the first angle.

2. The heater of claim 1, wherein the first terminal is electronically coupled to a power source and electronically insulated from the housing.

3. The heater of claim 1, further comprising:
a first ceramic holder positioned at a third interior position of the housing, the third interior position being between the first and second interior positions of the housing, the first ceramic holder configured to retain the first and second heating elements within the housing;
a second ceramic holder positioned at a fourth interior position of the housing, the fourth interior position being opposite the third interior position of the housing, the second ceramic holder configured to retain the first and second heating elements within the housing, wherein the first and second ceramic holders are coupled to the housing; and
a vibration dampener positioned between the first ceramic holder and a bracket to assist in dampening vibrations of the heating element.

4. The heater of claim 3, wherein:
the bracket is coupled to an interior surface of the housing and configured to support the vibration dampener.

5. The heater of claim 3, wherein the vibration dampener is a strip of metal material that is bent or formed in a shape of a letter S.

6. The heater of claim 1, wherein the first ceramic holder comprises a ceramic body having a plurality of openings to receive a portion of each of the first and second heating elements.

7. The heater of claim 1, wherein the first angle is between 15 and 35 degrees.

8. The heater of claim 1, wherein:
the first terminal is electrically connected to a connector configured to be coupled to a power supply; and
the second terminal is electrically connected to an electronic ground,
wherein electrical power is provided to the connector to heat the first and second heating elements.

9. The heater of claim 8, wherein the heater further comprises an additional connector connected to the power supply to provide additional electrical power to heat the first and second heating elements.

10. The heater of claim 1, further comprising a third heating element connected to the first terminal and to the second terminal and positioned between the first and second heating elements.

11. The heater of claim 1, further comprising a filter positioned downstream from the first and second heating elements relative to the direction of the flow of gas through the housing.

12. The heater of claim 11, wherein the heater is configured to perform a regeneration process to clean the filter.

13. The heater of claim 1, wherein the heater is a component of a vehicle exhaust system or a component of a power plant or an industrial exhaust system.

14. An exhaust system, comprising:
a housing defining an inlet and an outlet for a flow of gas through the housing;
a first heating element connected to a first terminal at a first interior position of the housing and to a second terminal at a second interior position of the housing, wherein the first interior position is opposite the second interior position, wherein the first heating element is tilted at a first angle relative to a direction of the flow of gas through the housing;
a second heating element connected to another first terminal and another second terminal, wherein the second heating element is tilted at a second angle relative to the direction of the flow of gas through the housing, wherein the second angle is opposite the first angle; and
a filter positioned downstream from the first and second heating elements to a direction of the flow of gas through the housing.

15. The exhaust system of claim 14, wherein the filter is a diesel particulate filter, and the first and second heating elements are configured to perform a regeneration process to clean the diesel particulate filter.

16. The exhaust system of claim 14, further comprising a third heating element connected to the first terminal, wherein the third heating element is positioned between the first and second heating elements and is oriented substantially perpendicular to the direction of the flow of gas through the housing.

17. A heater, comprising:
a housing defining an inlet and outlet for a flow of gas through the housing;
a first heating element connected to a terminal, wherein the first heating element is tilted at a first angle relative to a direction of the flow of gas through the housing;
a second heating element connected to the terminal, wherein the second heating element is tilted at a second angle relative to the direction of the flow of gas through the housing, wherein the second angle is opposite the first angle.

18. The heater of claim 17, further comprising a third heating element connected to the terminal, wherein the third heating element is positioned between the first and second heating elements and is oriented substantially perpendicular to the direction of the flow of gas through the housing.

\* \* \* \* \*